US012800359B2

(12) United States Patent
Thor et al.

(10) Patent No.: US 12,800,359 B2
(45) Date of Patent: *Nov. 17, 2026

(54) OPTICAL ENCODER CAPABLE OF REGULATING GAIN OF INDEX OUTPUT

(71) Applicant: PixArt Imaging Inc., Hsin-Chu County (TW)

(72) Inventors: Chung-Min Thor, Penang (MY); Kuan-Choong Shim, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 140 days.

This patent is subject to a terminal disclaimer.

(21) Appl. No.: 18/824,949

(22) Filed: Sep. 5, 2024

(65) Prior Publication Data

US 2024/0426639 A1 Dec. 26, 2024

Related U.S. Application Data

(63) Continuation of application No. 18/129,077, filed on Mar. 31, 2023, now Pat. No. 12,117,318, which is a continuation of application No. 17/240,140, filed on Apr. 26, 2021, now Pat. No. 11,644,345.

(51) Int. Cl.
*G01D 5/347* (2006.01)

(52) U.S. Cl.
CPC ................................ *G01D 5/34715* (2013.01)

(58) Field of Classification Search
CPC ....... G01D 5/34715; G01D 5/249; G01D 5/34
See application file for complete search history.

(56) References Cited

U.S. PATENT DOCUMENTS 4,808,933 A 2/1989 Kobayashi et al.
5,019,773 A 5/1991 Sugiura et al.
5,073,710 A * 12/1991 Takagi ..................... G01D 5/38 250/237 G
5,569,913 A * 10/1996 Ishizuka .................. G01D 5/38 250/237 G
11,644,345 B2 * 5/2023 Thor .................. G01D 5/34715 250/231.1
12,117,318 B2 * 10/2024 Thor .................. G01D 5/34715
12,203,956 B2 1/2025 Thor et al.
2005/0157307 A1 * 7/2005 Yamamoto ............ H03M 1/301 356/499
2009/0206244 A1 * 8/2009 Bahari ............... G01D 5/34746 250/231.13
2009/0272884 A1 * 11/2009 Toh ...................... G01D 5/3473 250/231.1

(Continued)

*Primary Examiner* — Jennifer D Bennett
(74) *Attorney, Agent, or Firm* — WPAT, PC

(57) ABSTRACT

There is provided an optical encoder including an encoding medium and a substrate. The encoding medium has a relative movement with respect to the substrate in a predetermined direction. The substrate includes an index photodiode and two control photodiodes. The index photodiode is arranged between the two control photodiodes along the predetermined direction. The output signals of the two control photodiodes are for controlling ON/OFF of gain regulation on an output signal of the index photodiode so as to turn on the gain regulation within an interval during which the index photodiode does not generate an index pulse but to turn off the gain regulation within an interval during which the index photodiode generates the index pulse.

11 Claims, 8 Drawing Sheets

(56) References Cited

U.S. PATENT DOCUMENTS

| | | | | |
|---|---|---|---|---|
| 2009/0272885 | A1* | 11/2009 | Thor .................. | G01D 5/24476 250/231.1 |
| 2012/0104236 | A1* | 5/2012 | Thor ..................... | H03M 1/203 250/208.6 |
| 2014/0191119 | A1* | 7/2014 | Augustyniak ...... | G01D 5/34715 250/231.1 |

* cited by examiner

OPTICAL ENCODER CAPABLE OF REGULATING GAIN OF INDEX OUTPUT

CROSS REFERENCE TO RELATED APPLICATION

The present application is a continuation application of U.S. application Ser. No. 18/129,077, filed on Mar. 31, 2023, which is a continuation application of U.S. application Ser. No. 17/240,140, filed on Apr. 26, 2021, the disclosures of which are hereby incorporated by reference herein in their entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to an optical encoder and, more particularly, to an optical encoder that adopts additional control photodiodes for turning on and off gain regulation of the index output.

2. Description of the Related Art

Please refer to FIGS. 1 and 2, they are operational schematic diagrams of a conventional optical encoder. The optical encoder includes a light source 10, a substrate 20 and a code disk 30, wherein the substrate 20 is separated from the code disk 30 by a longitudinal distance (or Z distance). The longitudinal distance shown in FIG. 1 is smaller than that shown in FIG. 2. The substrate 20 is arranged with a position photodiode 21 and an index photodiode 23.

The longitudinal distance can be different due to the assembling process. Since an emission angle of the light source 10 is not changed, when the longitudinal distance is increased, light intensity of light reflected by the code disk 30 to the position photodiode 21 becomes lower, and light intensity of light reflected by the code disk 30 to the index photodiode 23 does not have a significant variation due to a longer distance from the light source 10, as shown in FIG. 3A. Because the output signal from the position photodiode 21 is for calculating a rotation angle of the code disk 30, fluctuation of the light intensity received thereby can degrade the calculation accuracy.

For keeping incident light intensity of the position photodiode 21 to be substantially identical, it is known that this can be achieved by regulating emission light intensity of the light source 10. For example, when the longitudinal distance is smaller, the emission light intensity of the light source 10 is decreased, or otherwise when the longitudinal distance is larger, the emission light intensity of the light source 10 is increased. In this way, the position photodiode 21 can output substantially identical photocurrent as shown in FIG. 3B. However, the output photocurrent of the index photodiode 23 is then changed. For example, FIG. 3B shows that intensity of photocurrent outputted by the index photodiode 23 can have about 2.5 times of difference between longitudinal distances of 2.2 mm and 1 mm.

In FIG. 4, reference numerals 231L and 233L indicate voltage values respectively associated with two index photodiodes under a smaller longitudinal distance; and reference numerals 231H and 233H indicate voltage values respectively associated with the two index photodiodes under a larger longitudinal distance.

A pulse width of the index output is determined by voltage values converted from photocurrents outputted by the two index photodiode. It is seen from FIG. 4 that if emission light intensity of the light source 10 is adjusted corresponding to different longitudinal distances (referring to FIG. 3B), the pulse width of the index output can have a significant variation.

Accordingly, the present disclosure further provides an optical encoder that adjusts emission light intensity of a light source corresponding to different longitudinal distances in conjunction with keeping a pulse width of the index output to be substantially identical by regulating a gain of index output.

SUMMARY

The present disclosure provides an optical encoder that keeps a pulse width of the index output to be substantially identical by arranging additional control photodiodes for turning on and turning off gain regulation of output signals of the index photodiode.

The present disclosure provides an optical encoder including an encoding medium, a substrate, a gain control circuit and a regulation control circuit. The encoding medium has an index pattern. The substrate is configured to have a relative movement with respect to the encoding medium along a first direction, and includes an index photodiode, a first control photodiode and a second control photodiode. The index photodiode is configured to generate an index signal. The first control photodiode is configured to generate a first control signal. The second control photodiode is configured to generate a second control signal, wherein the index photodiode is arranged between and in parallel with the first control photodiode and the second control photodiode in the first direction. The gain control circuit is configured to amplify the index signal using a gain. The regulation control circuit is configured to turn on or turn off gain regulation of the gain control circuit according to the first control signal and the second control signal.

The present disclosure further provides an optical encoder including an encoding medium, a substrate and a light source. The encoding medium has an index pattern. The substrate is configured to have a relative movement with respect to the encoding medium along a first direction, and has a longitudinal distance from the encoding medium. The substrate includes two index photodiodes, a first control photodiode and a second control photodiode. The two index photodiodes are adjacent to each other in the first direction. The first control photodiode and the second control photodiode have a same shape identical to that of the two index photodiodes, and the two index photodiodes are arranged between and in parallel with the first control photodiode and the second control photodiode in the first direction. The light source is configured to illuminate the encoding medium using emission light of different intensity according to the longitudinal distance.

The present disclosure provides an optical encoder including two index photodiodes, a first control photodiode, a second control photodiode, a gain control circuit and a regulation control circuit. The two index photodiodes are adjacent to each other in a first direction, and configured to respectively generate an index signal. The first control photodiode is configured to generate a first control signal. The second control photodiode is configured to generate a second control signal, wherein the first control photodiode and the second control photodiode have a same shape identical to that of the two index photodiodes, and the two index photodiodes are arranged between and in parallel with the first control photodiode and the second control photodiode in the first direction. The gain control circuit is configured to amplify the index signal using a gain. The regulation control circuit is configured to turn on or turn off gain regulation of the gain control circuit according to the first control signal and the second control signal.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The optical encoder of the present disclosure is adaptable to a reflective type optical encoder that regulates emission intensity of a light source corresponding to a longitudinal distance (or Z distance) between an encoding medium and a light source to cause photocurrent outputted by the position photodiode to be substantially fixed. In the present disclosure, in order to cause a pulse width of an index pulse generated by the index photodiode to be fixed at the same time, gain regulation is further performed on the index voltage signal (e.g., generated from index photocurrent passing a trans-impedance amplifier). In addition, in order not to disturb the index pulse, the gain regulation is turned off within an interval during which the index pulse is generated. The gain regulation is turned on to maintain a reference value of the index signal to be within a predetermined range only within an interval during which the index pulse is not generated.

Figure 5:
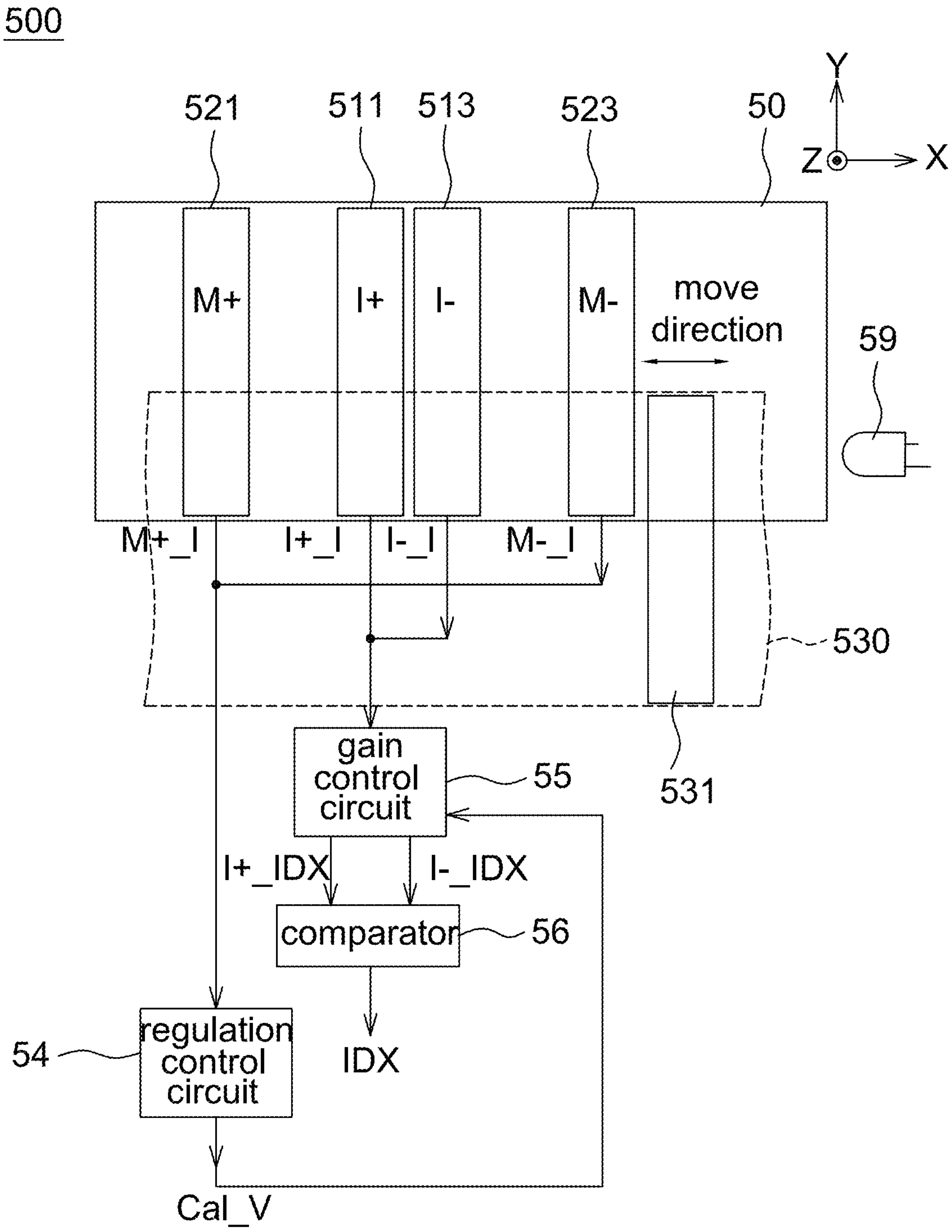
FIG. 5 is a schematic diagram of an optical encoder according to one embodiment of the present disclosure.

Please refer to FIG. 5, it is a schematic diagram of an optical encoder 500 according to one embodiment of the present disclosure. The optical encoder 500 includes an encoding medium 530 (only a part being shown) and a substrate 50 arranged opposite to each other. The encoding medium 530 is, for example, a code disk or a code strip that rotates or linearly moves with respect to the substrate 50 depending on different applications. For example, FIG. 5 shows that the substrate 50 has a relative movement with respect to the encoding medium 530 in a first direction (e.g., X direction). In the relative movement, at least one of the encoding medium 530 and the substrate 50 is moving.

The substrate 50 has a longitudinal distance from the encoding medium 530 in the Z direction. The optical encoder 500 further includes a light source 59 for illuminating the encoding medium 530 to generate modulated light to be reflected to the light sensing device on the substrate 50. In the present disclosure, the light source 59 generates emission light of different intensity to illuminate the encoding medium 530 to keep modulated reflective light to have substantially identical intensity. The light source 59 is, for example, a light emitting diode, for emitting light of an identifiable spectrum, e.g., red light and/or infrared light.

The encoding medium 530 includes an index pattern 531. The index pattern 531 is a reflective surface (reflecting light of the light source 59) or a light absorbing surface (absorbing light of the light source 59) depending on different applications. The relative movement between the encoding medium 530 and the substrate 50 along the first direction causes the index pattern 531 to periodically (under fixed moving speed) move across the light sensing device of the substrate 50. It should be mentioned that the encoding medium 530 further includes the position pattern (or called AB pattern) arranged at a different track from the index pattern 531. Since the position pattern is known to the art and not a main objective of the present disclosure, details thereof are not described herein.

The substrate 50 is selected from a printed circuit board (PCB) or a flexible substrate without particular limitations. The light sensing device on the substrate 50 includes a first index photodiode 511 (shown as I+), a second index photodiode 513 (shown as I−), a first control photodiode 521 (shown as M+) and a second control photodiode 523 (shown as M−). The first index photodiode 511 and the second index photodiode 513 are arranged between the first control photodiode 521 and the second control photodiode 523 along the first direction. The first control photodiode 521 and the second control photodiode 523 are used to define a range of the first index photodiode 511 and the second index photodiode 513 on the substrate 50.

It should be mentioned that the light sensing device on the substrate 50 further includes position photodiodes (or called AB photodiodes) for detecting reflective light from the position pattern on the encoding medium 530. Since the position photodiodes are known to the art and not a main objective of the present disclosure, details thereof are not described herein.

In one aspect, a sensing area of the first control photodiode 521 and the second control photodiode 523 is identical to a sensing area of each of the first index photodiode 511 and the second index photodiode 513. Although FIG. 5 shows that the sensing areas of the first index photodiode 511, the second index photodiode 513, the first control photodiode 521 and the second control photodiode 523 are rectangles and have the same shape, it is only intended to illustrate but not to limit the present disclosure. In other aspects, to improve output signals of photodiodes, a shape of the sensing areas of these photodiodes is changeable, e.g., changing to a trapezoid or a triangle, but not limited thereto.

In one aspect, the first control photodiode 521 and the second control photodiode 523 as well as the first index photodiode 511 and the second index photodiode 513 are corresponding to the same track (e.g., same radial position) of the encoding medium 530. Meanwhile, the first control photodiode 521 and the second control photodiode 523 are corresponding to different tracks of the encoding medium 530 from the position photodiodes on the substrate 50. In this aspect, said same track refers to that in the relative movement along the first direction, the index pattern 531 sequentially moves across the first control photodiode 521, the first index photodiode 511, the second index photodiode 513 and the second control photodiode 523, or vice versa.

Figure 7:
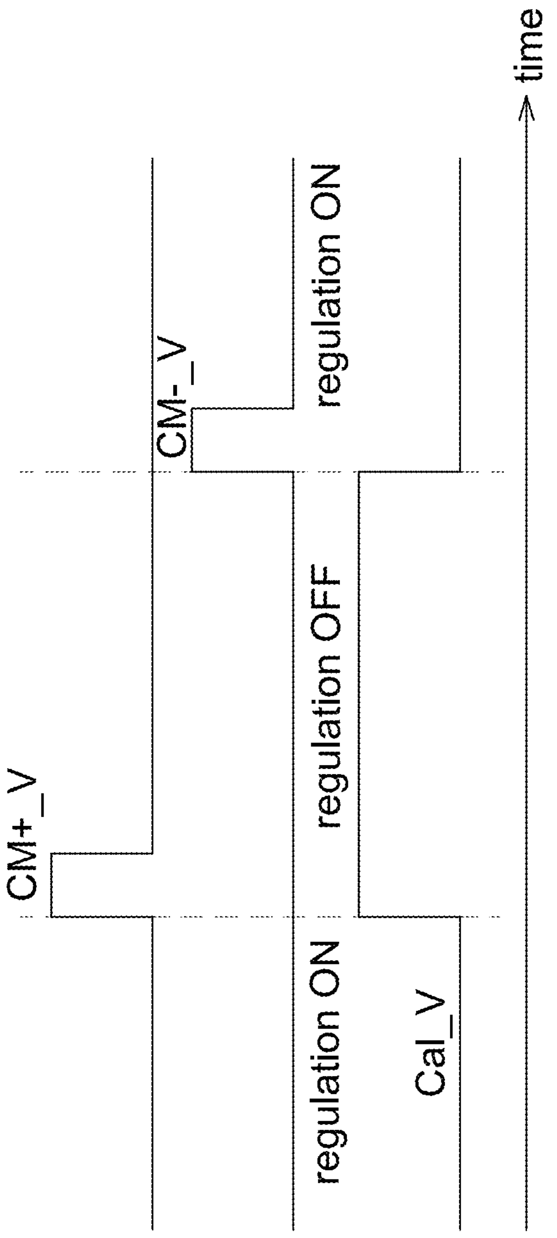
FIG. 7 is a signal timing diagram of a regulation control circuit of an optical encoder according to one embodiment of the present disclosure.

Although FIG. 5 shows that the height of the first control photodiode 521 and the second control photodiode 523 along the Y direction is identical to the height of the first index photodiode 511 and the second index photodiode 513, it is only intended to illustrate but not to limit the present disclosure. In other aspects, the height of the first control photodiode 521 and the second control photodiode 523 along the Y direction is different from the height of the first index photodiode 511 and the second index photodiode 513. When the index pattern 531 is moving across the first control photodiode 521 or the second control photodiode 523, the sensing area of the first control photodiode 521 or the second control photodiode 523 is totally or partially overlapped (or covered) by the index pattern 531 without particular limitations as long as regulation control signals CM+_V and CM−_V as shown in FIG. 7 are generated.

In one aspect, distances between the first control photodiode 521 and the first index photodiode 511 as well as between the second control photodiode 523 and the second index photodiode 513 along the first direction are larger than or equal to a width of the index pattern 531 along the first direction, but said distances are not particularly limited.

Figure 8:
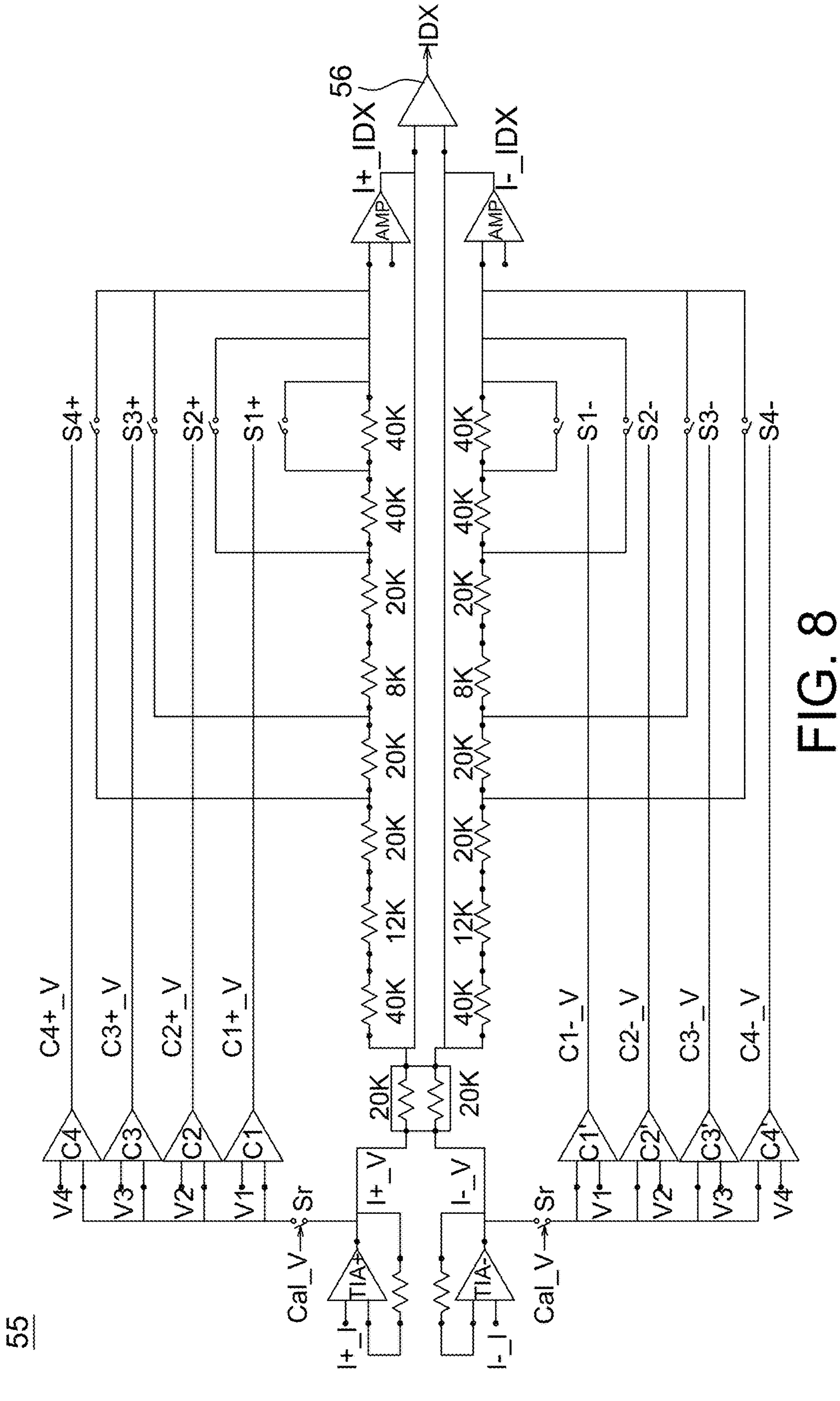
FIG. 8 is a circuit diagram of a gain control circuit of an optical encoder according to one embodiment of the present disclosure.

The first index photodiode 511 and the second index photodiode 513 are adjacent to each other in the first direction, and respectively generate index signals I+_I and I−_I, wherein I+_I and I−_I are current signals. After passing the trans-impedance amplifiers TIA+ and TIA− (as shown in FIG. 8), index voltage signals I+_V and I−_V are respectively generated. In the present disclosure, since the index current signals I+_I and I−_I as well as the index voltage signals I+_V and I−_V are generated by current-voltage conversion of the trans-impedance amplifiers and have corresponding values according to the parameter of the trans-impedance amplifiers, for simplification purposes the signals I+_V and I−_V as well as the signals I+_I and I−_I are all called index signals indicating that they are generated by index photodiodes 511 and 513.

Figure 6:
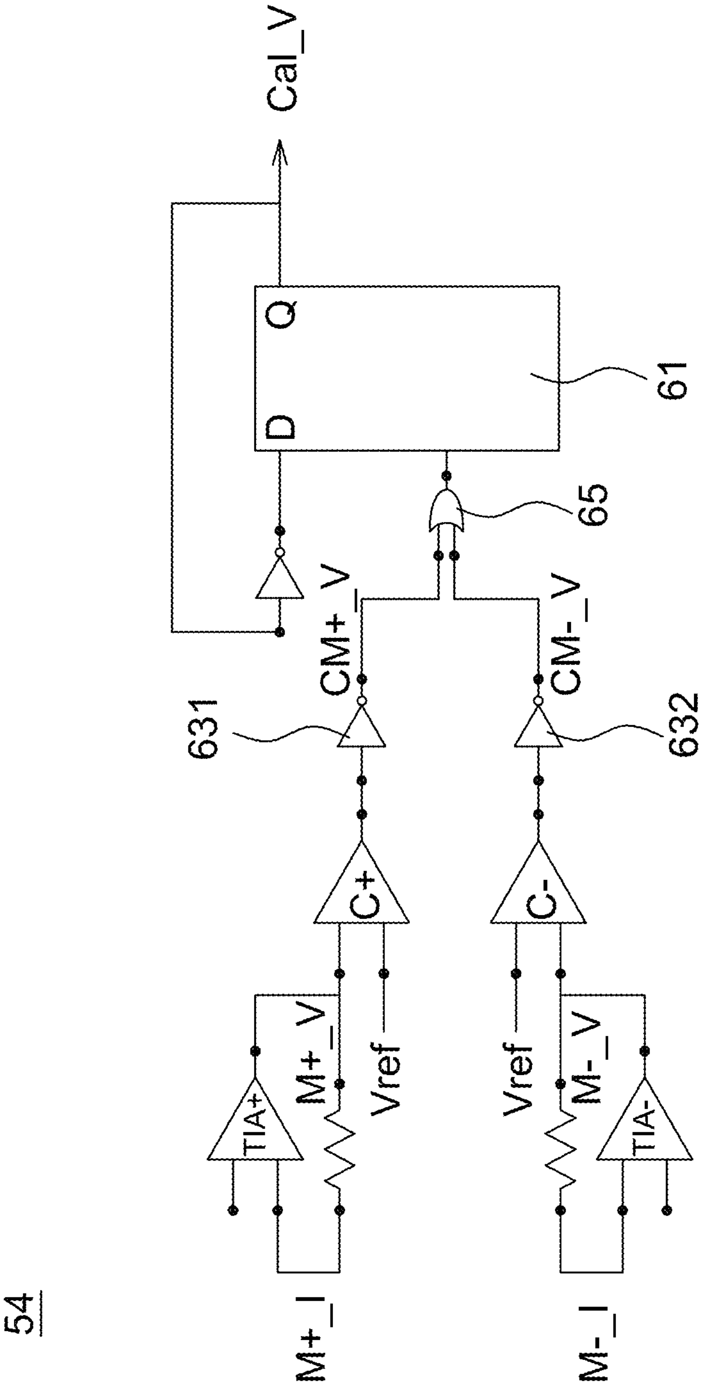
FIG. 6 is a circuit diagram of a regulation control circuit of an optical encoder according to one embodiment of the present disclosure.

The first control photodiode 521 generates a first control signal M+_I. The second control photodiode 523 generates a second control signal M−_I. Similarly, M+_I and M−_I are current signals. After passing the trans-impedance amplifiers TIA+ and TIA− (as shown in FIG. 6), control voltage signals M+_V and M−_V are respectively generated. In the present disclosure, since the control current signals M+_I and M−_I as well as the control voltage signals M+_V and M−_V are generated by current-voltage conversion of the trans-impedance amplifiers and have corresponding values according to the parameter of the trans-impedance amplifiers, for simplification purposes the signals M+_V and M−_V as well as the signals M+_I and M−_I are all called control signals indicating that they are generated by control photodiodes 521 and 523.

The optical encoder 500 further includes a gain control circuit 54 electrically connected to the first index photodiode 511 and the second index photodiode 513 so as to receive the index current signals I+_I and I−_I. The gain control circuit 55 amplifies the index voltage signals I+_V and I−_V using a gain. For example, when the signal intensity of the index signals I+_I and I−_I (or I+_V and I−_V) is larger (corresponding to stronger emission light), the gain is smaller; on the contrary, when the signal intensity of the index signals I+_I and I−_I (or I+_V and I−_V) is smaller (corresponding to weaker emission light), the gain is larger. In this way, the amplified index signals I+_IDX and I−_IDX (referring to FIG. 8) is maintained within a predetermined range.

Figure 1:
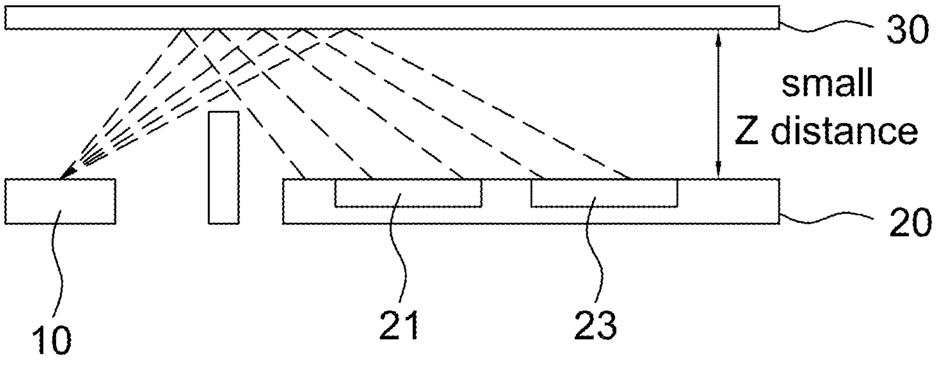
FIG. 1 (Prior Art)
FIG. 1 is an operational schematic diagram of a conventional optical encoder under a smaller longitudinal distance.
Figure 2:
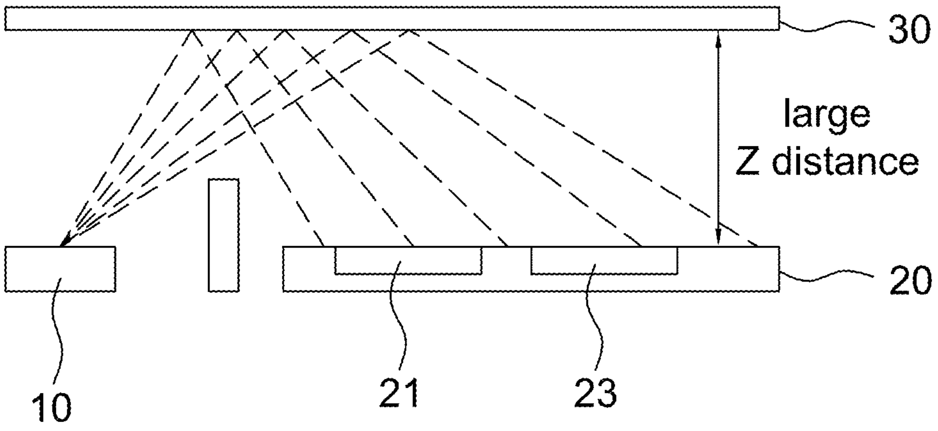
FIG. 2 (Prior Art)
FIG. 2 is an operational schematic diagram of a conventional optical encoder under a larger longitudinal distance.
Figure 3A:
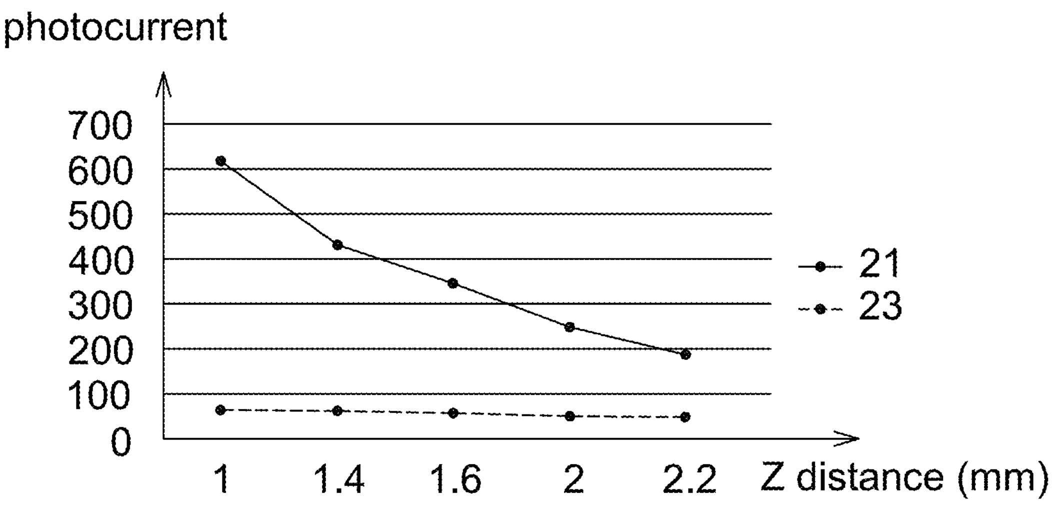
FIG. 3A (Prior Art)
FIG. 3A is a schematic diagram of output photocurrents of the position photodiode and the index photodiode under different longitudinal distances of the optical encoder of FIGS. 1 and 2, wherein the light source intensity is not adjusted corresponding to the longitudinal distances.
Figure 3B:
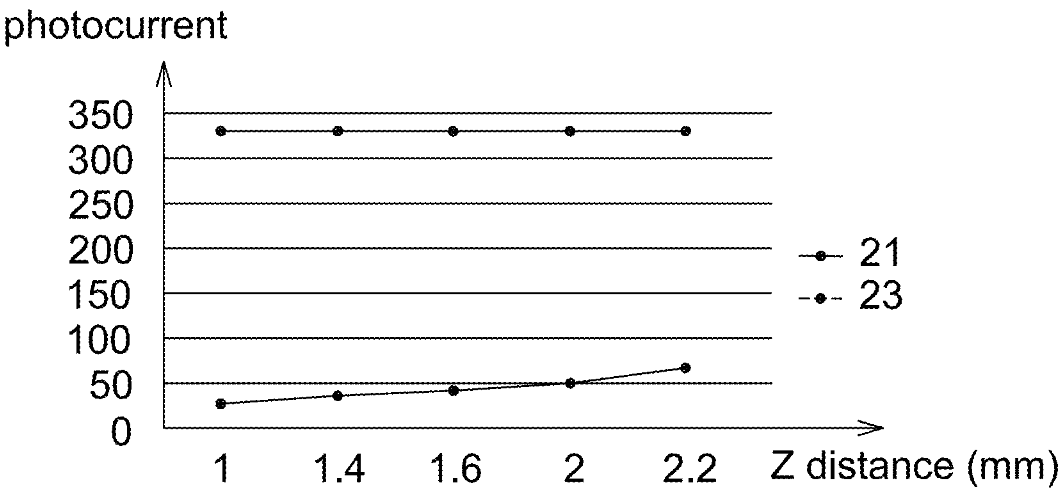
FIG. 3B (Prior Art)
FIG. 3B is a schematic diagram of output photocurrents of the position photodiode and the index photodiode under different longitudinal distances of the optical encoder of FIGS. 1 and 2, wherein the light source intensity is adjusted corresponding to the longitudinal distances.

Please refer to FIG. 8, it is a circuit diagram of a gain control circuit 55 of an optical encoder 500 according to one embodiment of the present disclosure. The index signals I+_V and I−_V respectively outputted by TIA+ and TIA− are compared (e.g., using comparators C1 to C4 and C1' to C4') with multiple thresholds (e.g., shown as V1 to V4 in FIG. 8, wherein $V1<V2<V3<V4$) to change the gain in a step manner. For example, when I+_V (or I−_V) is larger than the predetermined voltage V4 (e.g., under larger longitudinal distance, referring to FIG. 3B), voltages C1+_V to C4+_V (or C1−_V to C4−_V) outputted by the comparators C1 to C4 (or C1' to C4') are at a high level so as to conduct multiple switches S1 to S4 to generate a smaller gain. For example, when I+_V (or I−_V) is smaller than the predetermined voltage V1 (e.g., under smaller longitudinal distance, referring to FIG. 3B), voltages C1+_V to C4+_V (or C1−_V to C4−_V) outputted by the comparators C1 to C4 (or C1' to C4') are at a low level so as to disconnect multiple switches S1 to S4 to generate a larger gain.

That is, in the aspect shown in FIG. 8, the gain control circuit 55 includes multiple cascaded resistors (shown as 9 resistors, but not limited to) and multiple bypass paths (shown as 4 paths, but not limited to). The multiple bypass paths respectively bypass at least one of the multiple resistors. For example, the comparison output of the index signals I+_V and I−_V compared with multiple voltage thresholds V1 to V4 are respectively used to connect or disconnect the multiple bypass paths via the switches S1 to S4. When the voltages C1+_V to C4+_V (and C1−_V to C4−_V) are at a high level, the corresponding switches S1 to S4 are conducted; whereas, when the voltages C1+_V to C4+_V (and C1−_V to C4−_V) are at a low level, the corresponding switches S1 to S4 are disconnected. In another aspect, the connection and disconnection of the multiple switches S1 to S4 are set oppositely corresponding to high or low levels.

The optical encoder 500 further includes a regulation control circuit 54 electrically connected to the first control photodiode 521 and the second control photodiode 523 so as to receive the first control signal M+_I and the second control signal M−_I. The regulation control circuit 54 outputs a regulation control signal Cal_V to the gain control circuit 55 according to the first control signal M+_I and the second control signal M−_I to turn on or turn off gain regulation of the gain control circuit 55.

Please refer to FIG. 6, it is a circuit diagram of a regulation control circuit 54 of an optical encoder 500 according to one embodiment of the present disclosure. For example, when the index pattern 531 moves in the first direction (leftward or rightward in FIG. 5) to be opposite to the first control photodiode 521, the first control photodiode 521 is overlapped with the index pattern 531 and generates a first control signal M+_V having a low level; and when the index pattern 531 moves in the first direction (leftward or rightward in FIG. 5) to be opposite to the second control photodiode 523, the second control photodiode 523 is overlapped with the index pattern 531 and generates a second control signal M−_V having a low level.

After the first control signal M+_V passes a comparator C+ and an inverter 631, a first regulation control signal CM+_V (e.g., referring to FIG. 6) is generated to be inputted into one input terminal of an OR gate 65. After the second control signal M−_V passes a comparator C− and an inverter 632, a second regulation control signal CM−_V (e.g., referring to FIG. 6) is generated to be inputted into another input terminal of the OR gate 65.

In the present disclosure, the first regulation control signal CM+_V and the second regulation control signal CM−_V are the output after being compared and inverted from the first control signal M+_V and the second control signal M−_V, and thus are corresponding to the first control signal M+_V and the second control signal M−_V based on the parameter of the comparators C+ and C− as well as the inverters 631 and 632. For simplification purposes, the first regulation control signal CM+_V and the second regulation control signal CM−_V are also respectively called the first control signal and the second control signal indicating that they are associated with the first control photodiode 521 and the second control photodiode 523. For example, in one aspect, the trans-impedance amplifiers TIA+ and TIA−, the comparators C+ and C−, the inverters 631 and 632 are arranged in the same conversion circuit, which receives the signals M+_I and M−_I and outputs signals CM+_V and CM−_V to the OR gate 65. High and low levels of the signals in FIG. 7 are changeable according to different circuit configuration.

The regulation control circuit 54 further includes a flip flop 61 connected to an output terminal of the OR gate 65 for changing (from High to Low or from Low to High) a voltage value of a regulation control signal Cal_V outputted by the regulation control circuit 54 according to the first control signal CM+_V and the second control signal CM−_V, as shown in FIG. 7. The voltage value (or voltage level) of the regulation control signal Cal_V is to turn on or turn off the gain regulation of the gain control circuit 55.

For example referring to FIGS. 5-7, when the index pattern 531 is moved to be within a region between the first control photodiode 521 and the second control photodiode 523 to cause the regulation control signal Cal_V to have a high voltage value (more specifically a level change), the regulation control circuit 54 turns off the gain regulation of the gain control circuit 55 within a first interval between the first control signal CM+_V and the second control signal CM−_V. When the index pattern 531 is moved to be outside the region between the first control photodiode 521 and the second control photodiode 523 to cause the regulation control signal Cal_V to have a low voltage value (e.g., a second interval outside the first interval), the regulation control circuit 54 turns on the gain regulation of the gain control circuit 55.

The gain control circuit 55 includes a control switch Sr that is used to turn on or turn off the gain regulation of the gain control circuit 55 according to the voltage value of the regulation control signal Cal_V.

In another aspect, according to a different circuit configuration, the gain regulation of the gain control circuit 55 is turned on when the regulation control signal Cal_V is at a low level (within the first interval), and the gain regulation of the gain control circuit 55 is turned off when the regulation control signal Cal_V is at a high level (outside the first interval).

Figure 4:
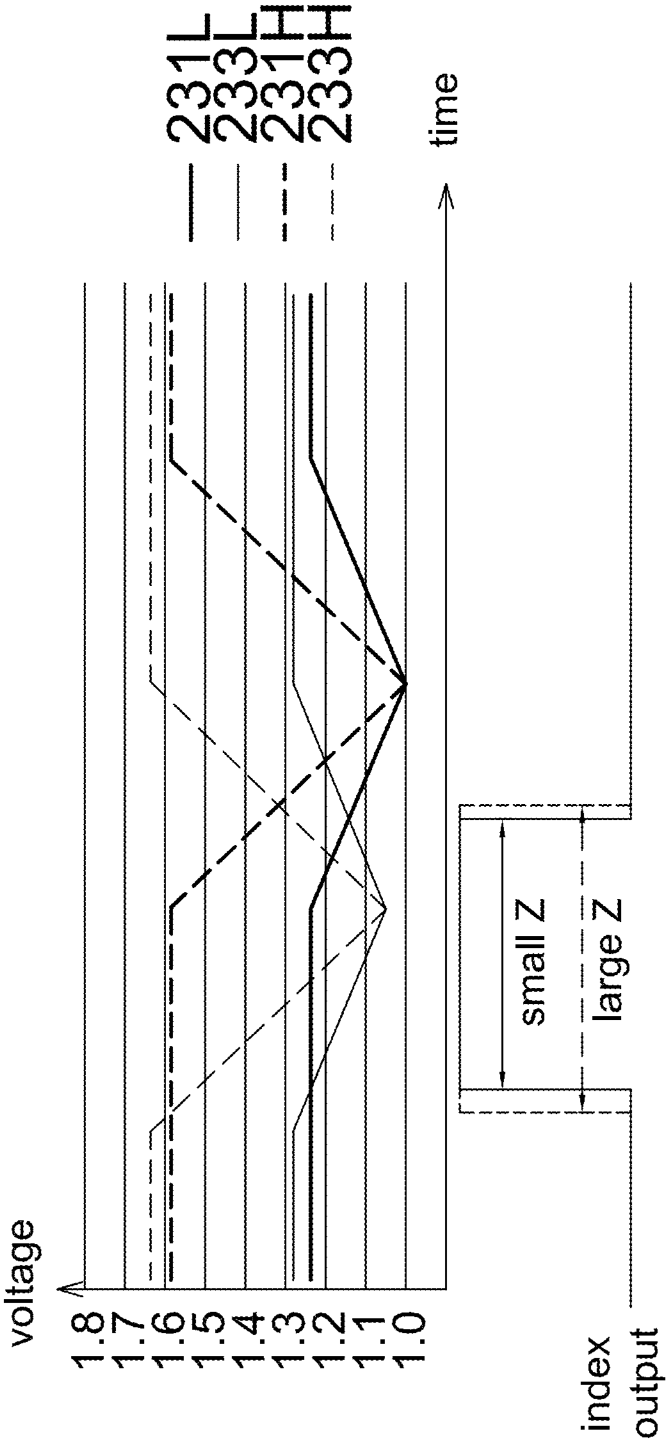
FIG. 4 (Prior Art)
FIG. 4 is a schematic diagram of the index output corresponding to two different longitudinal distances of a conventional optical encoder.

Please refer to FIG. 8 again, the optical encoder 500 further includes a comparator 56 inside or outside the gain control circuit 55 without particular limitations. The comparator 56 receives two amplified index signals I+_IDX and I−_IDX, e.g., 531L and 533L or 531H and 533H shown in FIG. 9, outputted by the gain control circuit 55 so as to generate an index pulse IDX, wherein reference numerals 531L and 533L indicate two amplified index signals I+_IDX and I−_IDX when the substrate 50 (or light source 59) has a shorter longitudinal distance from the encoding medium 530; whereas, 531H and 533H indicate two amplified index signals I+_IDX and I−_IDX when the substrate 50 (or light source 59) has a longer longitudinal distance from the encoding medium 530. As the present disclosure further adopts the gain control circuit 55, compared to FIG. 4, the gain control circuit 55 shown in FIG. 9 causes 531L to be closer to 531H, and 533L to be closer to 533H.

Figure 9:
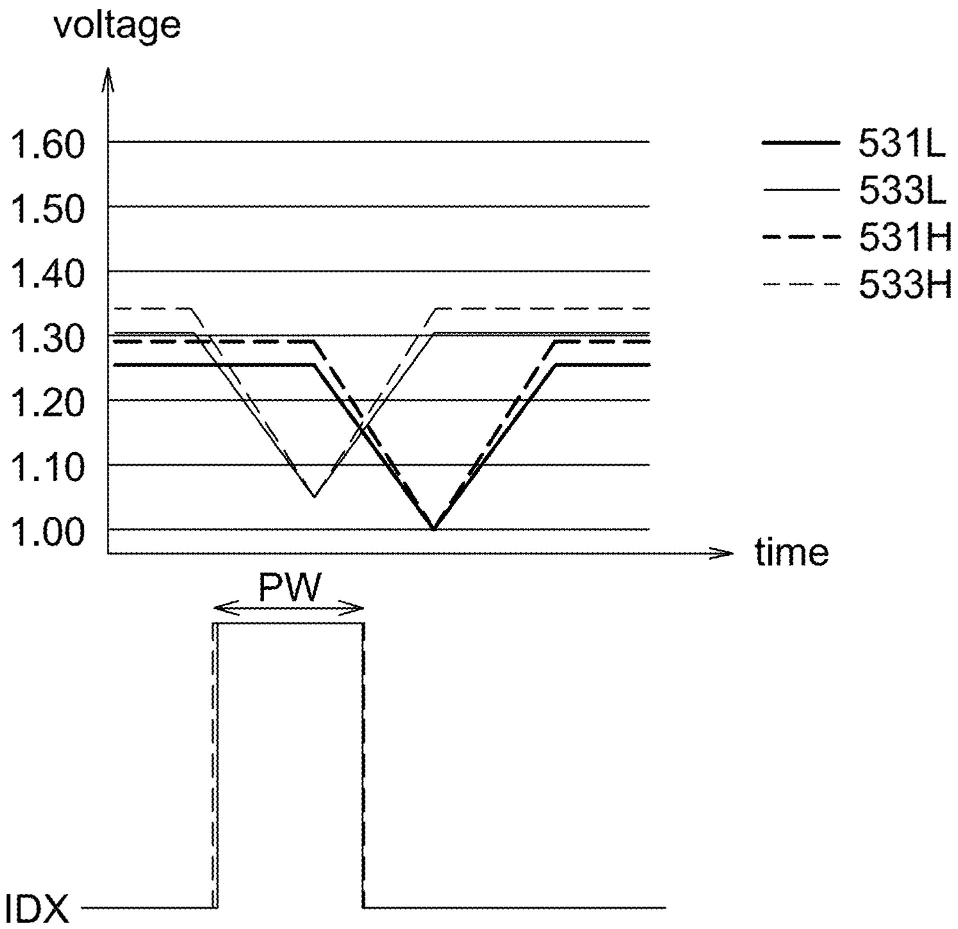
FIG. 9 is a schematic diagram of the index output corresponding to two different longitudinal distances of an optical encoder according to one embodiment of the present disclosure.

In the present disclosure, the gain regulation of the gain control circuit 55 is used to keep a pulse width PW of the index pulse IDX to be substantially similar as shown in FIG. 9. As mentioned above, the gain regulation of the gain control circuit 55 is turned off within an interval of the pulse width PW.

It should be mentioned that the values mentioned in the above embodiment, including resistors, voltage values, thresholds, a number of thresholds, a number of photodiodes, a number of switches, a number of comparators, a number of resistors, the spatial distance and the component shape, are only intended to illustrate but not to limit the present disclosure.

In the present disclosure, the gain regulation of the gain control circuit 55 is referred to conducting the control switch Sr by the regulation control signal Cal_V such that it is able to connect or disconnect the switches S1 to S4 based on the comparison result of comparators C1 to C4 and C1' to C4' so as to regulate a gain for amplifying index signals I+_V and I−_V.

As mentioned above, the conventional optical encoder with adjustable emission light intensity can cause a width of the index pulse to have a deviation thereby decreasing the identification accuracy. Accordingly, the present disclosure further provides an optical encoder capable of maintaining the index pulse width (e.g., FIG. 5) that regulates the gain of index signals within an interval during which the index photodiode does not generate the index pulse to cause the index output to be substantially identical corresponding to different longitudinal distances thereby keeping the index pulse width generated by the index photodiodes to be fixed.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical encoder, comprising:

an encoding medium, comprising an index pattern;

a substrate, configured to have a relative movement with respect to the encoding medium along a first direction, and comprising:

an index photodiode, configured to generate an index signal;

a first control photodiode, configured to generate a first control signal; and a second control photodiode, configured to generate a second control signal, wherein the index photodiode is arranged between and in parallel with the first control photodiode and the second control photodiode in the first direction;

a gain control circuit, configured to amplify the index signal using a gain; and a regulation control circuit, configured to turn on or turn off gain regulation of the gain control circuit according to the first control signal and the second control signal, wherein when the index pattern is moved in the first direction to opposite to the first control photodiode, the first control photodiode generates the first control signal, when the index pattern is moved in the first direction to opposite to the second control photodiode, the second control photodiode generates the second control signal, and the regulation control circuit is configured to turn off the gain regulation of the gain control circuit within a first interval between the first control signal and the second control signal, and to turn on the gain regulation of the gain control circuit within a second interval outside the first interval.

2. The optical encoder as claimed in claim 1, wherein the regulation control circuit comprises a flip flop configured to change a voltage value of a regulation control signal outputted by the regulation control circuit according to the first control signal and the second control signal, and the voltage value of the regulation control signal is configured to turn on or turn off the gain regulation of the gain control circuit.

3. The optical encoder as claimed in claim 2, wherein the gain control circuit comprises a control switch configured to turn on or turn off the gain regulation of the gain control circuit according to the voltage value of the regulation control signal.

4. The optical encoder as claimed in claim 1, wherein when signal intensity of the index signal is larger, the gain is smaller, and when the signal intensity of the index signal is smaller, the gain is larger.

5. The optical encoder as claimed in claim 1, wherein the index signal is configured to change the gain in a step manner.

6. An optical encoder, comprising:

two index photodiodes, adjacent to each other in a first direction, and configured to respectively generate an index signal;

a first control photodiode, configured to generate a first control signal;

a second control photodiode, configured to generate a second control signal, wherein the first control photodiode and the second control photodiode have a same shape identical to that of the two index photodiodes, and the two index photodiodes are arranged between and in parallel with the first control photodiode and the second control photodiode in the first direction;

a gain control circuit, configured to amplify the index signal using a gain; and a regulation control circuit, configured to turn on or turn off gain regulation of the gain control circuit according to the first control signal and the second control signal, wherein the regulation control circuit comprises a flip flop configured to change a voltage value of a regulation control signal outputted by the regulation control circuit according to the first control signal and the second control signal, and the voltage value of the regulation control signal is configured to turn on or turn off the gain regulation of the gain control circuit.

7. The optical encoder as claimed in claim 6, wherein the gain control circuit comprises a control switch configured to turn on or turn off the gain regulation of the gain control circuit according to the voltage value of the regulation control signal.

8. The optical encoder as claimed in claim 6, wherein when signal intensity of the index signal is larger, the gain is smaller, and when the signal intensity of the index signal is smaller, the gain is larger.

9. The optical encoder as claimed in claim 6, wherein the index signal is configured to change the gain in a step manner.

10. The optical encoder as claimed in claim 6, further comprising:

a comparator, configured to receive two amplified index signals outputted by the gain control circuit to generate an index pulse.

11. The optical encoder as claimed in claim 10, wherein the gain regulation of the gain control circuit is configured to fix a pulse width of the index pulse.

* * * * *